(12) United States Patent
Malenke et al.

(10) Patent No.: US 8,215,087 B2
(45) Date of Patent: Jul. 10, 2012

(54) APPARATUS AND METHOD OF FORMING A STACK OF FOOD PRODUCTS WITHIN A STORAGE CONTAINER

(75) Inventors: Mark Ervin Malenke, Sun Prairie, WI (US); Scott Adler, Green Bay, WI (US); Tod Heleniak, Green Bay, WI (US); Dave Hess, Green Bay, WI (US)

(73) Assignee: Kraft Foods Global Brands LLC, Northfield, IL (US)

(*) Notice: Subject to any disclaimer, the term of this patent is extended or adjusted under 35 U.S.C. 154(b) by 188 days.

(21) Appl. No.: 12/334,990

(22) Filed: Dec. 15, 2008

(65) Prior Publication Data

US 2010/0146909 A1 Jun. 17, 2010

(51) Int. Cl.
*B65B 35/50* (2006.01)

(52) U.S. Cl. ............... 53/447; 53/148; 53/236; 53/444; 53/540

(58) Field of Classification Search .............. 53/447, 53/444, 148, 537, 539, 540, 236; 198/418.6, 198/419.3
See application file for complete search history.

(56) References Cited

U.S. PATENT DOCUMENTS

| | | | |
|---|---|---|---|
| 3,445,986 A | 5/1969 | Godet | |
| 3,498,022 A | 3/1970 | Godet | |
| 3,670,474 A * | 6/1972 | Vieson et al. | 53/55 |
| 3,877,199 A | 4/1975 | Lipes | |
| 4,162,870 A * | 7/1979 | Storm | 414/798.5 |
| 4,633,652 A | 1/1987 | Dagenais et al. | |
| 4,733,518 A | 3/1988 | Griesdorn | |
| 5,893,259 A | 4/1999 | Posge | |
| 6,141,943 A * | 11/2000 | Hart et al. | 53/444 |
| 6,625,960 B1 * | 9/2003 | Nambu | 53/502 |
| 2004/0168580 A1 * | 9/2004 | Harrison et al. | 99/443 C |
| 2007/0045083 A1 * | 3/2007 | Hart et al. | 198/418.6 |
| 2008/0305225 A1 * | 12/2008 | Harrison et al. | 426/392 |

FOREIGN PATENT DOCUMENTS

| | | |
|---|---|---|
| EP | 0230795 A2 | 5/1987 |
| WO | 2004052758 A2 | 6/2004 |

* cited by examiner

*Primary Examiner* — Thanh Truong
(74) *Attorney, Agent, or Firm* — Fitch, Even, Tabin & Flannery, LLP

(57) ABSTRACT

An apparatus for forming a stack of food products in a storage container, and a method therefor. The apparatus comprises a first gate moveable between an open and a closed position that drops a row of food products onto a second gate moveable between an open and a closed position. The second gate receives multiple rows of food products and once a predetermined number of rows have been received, the second gate opens to release the rows of food products into the storage container below it. As the first gate shifts from the open to the closed position, it can advance, at least in part, a subsequent row of food products onto the first gate for later release onto the second gate. The area defined by the second gate and the first gate is a temporary staging area which can increase in height after receiving subsequent rows of food products.

17 Claims, 8 Drawing Sheets

APPARATUS AND METHOD OF FORMING A STACK OF FOOD PRODUCTS WITHIN A STORAGE CONTAINER

FIELD

The present disclosure relates generally to an apparatus for forming a stack of food products within a storage container, and a method therefor, and, in particular, of forming a stack with multiple food products maintained in the container and in a defined quantity.

BACKGROUND

Food products that need to be transported from one destination to another can be packaged in a carton or box. In the retail market, the number of food product items that are packaged in a particular box need to be relatively exact such that no more or no less than a given quantity of the product is included in the box. This is especially important in the area of packaging food products. In order to package a given quantity of a food product, the boxes can be packaged by hand and counted by the person packing the box.

The desire to automate the packaging process developed, and such a task was carried out by machines. One way this was done was by transporting the food product along a conveyor line at the end of which was located a box or shipping carton to catch the food product therein as it fell off the end of the conveyor line. This packing method, however, could result in a haphazard arrangement of the food product in the carton, such that when the carton was packed with the food product, the food product was not necessarily aligned and precise counting of the food product was not achieved. An example of this method is shown in U.S. Pat. No. 3,877,199 for packaging frankfurters.

U.S. Pat. No. 3,445,986 describes filling containers automatically by feeding the product first into an intermediate area having sloping walls, so that the products slide into the container down the walls when the base of the intermediate area is opened. The products are cigars that are filled into containers having small cross-sectional areas. Where a heavier and larger product is to be filled, such as a frankfurter, a larger container would be needed and thus the filling would not be as orderly.

Another automated process involves collecting food products in a group before dropping into a box. One such process is disclosed in U.S. Patent Publication 2004/0168580. This process transports and loads frankfurters by arranging them in single layer groups within a staging area first, then dropping the frankfurters into an accumulation and storage area before finally dropping the accumulated frankfurters into a collection receptacle. The frankfurters are collected on a pair of retractable support rods in both the staging area and the accumulation and storage area, where the rods displace in a sidewardly direction to release or drop the frankfurters to the level below. However, upon dropping the frankfurters from the accumulation and storage area into the collection receptacle, tucking flaps are used to maintain the alignment of the frankfurters after they are dropped. Therefore, although the frankfurters are aligned before they are dropped, this alignment is not necessarily maintained after dropping from the accumulation and storage area and thus additional mechanical adjustment is still required to ensure proper alignment. Furthermore, the pair of retractable rods only support the frankfurters at two points along the body of the frankfurter. Thus, the weight of the frankfurter upon frankfurter, as in the accumulation and storage area, or the weight of the frankfurter alone upon the rod, as in the staging area, can put pressure upon the frankfurter at the contact point with the rods that can cause it to become deformed at that point and/or can cause the frankfurter to curl around the rods.

Regardless of which of the above loading methods are employed, the food product may end up being dropped from a high height upon being loaded into the box, thus resulting in a box containing food products that are not all arranged in the same direction due to the large drop upon falling. If the drop height is too high, the product could even become damaged upon being loaded into the box. When the packaged food product does not have a pleasing and orderly presentation within the box this can convey an undesirable impression. Additionally, the food product may shift during transportation if not aligned properly and thus the food product may become damaged as a result of this movement.

SUMMARY

An apparatus for and a method of forming a stack of food products in a storage container, such as a box or carton, are provided herein, where multiple food products are conveyed along a process line and are arranged in an orderly fashion on a first gate from which they are released onto a second gate before being released into the storage container. The apparatus comprises a process line including a conveyor line upon which food products can be transported in a machine direction such that each food product, such as a cylindrical food product, can be contained in its own discrete compartment along a conveyor belt. As the conveyor belt is advanced in a machine direction, it can sequentially deposit a plurality of food products in a row on a first gate maintained in a closed position. The first gate can be moveable between an open position and a closed position. The conveyor can further include a plurality of discrete compartments with outwardly open ends configured for individually segregating food products. A segment of travel of the conveyor with the discrete compartments can have their outwardly facing ends positioned above the first gate.

A predetermined quantity of food products can be positioned on the first gate, and the first gate can be actuated so that it shifts from a closed position to an open position, thus releasing the food products that rest on the first gate onto a second gate positioned below the first. The food products are relatively simultaneously dropped onto the second gate where they maintain their alignment forming an orderly row or first layer of food products. The second gate receives food products from the first gate when the first gate moves from the closed to the open position. The second gate is initially maintained in a closed position upon which the food products can be supported upon. The second gate can also have an open position to permit food products to fall past the second gate and into a storage container below. The second gate can include a pair of doors that can pivot away from each other to move the second gate from the closed to the open position, where the pivot axes of the doors are generally parallel to a direction of travel of the first gate (i.e., the direction the first gate moves to open and close). After dropping the food products onto the second gate, the first gate can return to its closed position and as it does so, it can advance a subsequent row of food products onto the first gate, thus providing the next group or layer of food products to be released onto the second gate.

The automation of the method of forming a stack of food products in a container can avoid manually packing and counting the food products and manually aligning them in orderly rows, as well as avoiding a haphazard arrangement of food products that can result when simply catching food products coming off the end of an automated conveyor belt. Additionally, due to the minimized distance the food products fall into the container upon opening the second gate, the food products can maintain their relative alignment when falling into the container and do not require any type of additional mechanical or manual adjustment to ensure that the proper alignment is maintained. With the advancement of the sausages along the conveyor while in their individual discrete compartments, a precise count of the sausages to be dropped from the first gate can be achieved. Furthermore, the food products are substantially fully supported upon the gates prior to dropping into the container, therefore, damage can be minimized to the food product itself from contacting surfaces that do not substantially fully support the food products along relatively their entire lengths.

Furthermore, the second gate can be moveable between at least an initial position spaced from the first gate and a subsequent position spaced further from the first gate than the initial spaced position to accommodate receiving additional rows of food products thereon. The second gate can further include a shield associated with the second gate and positioned to restrict movement of the food products after the food products initially fall onto the second gate adjacent the initial spaced position. A controller can also be provided for controlling the operation of the conveyor, the first gate and the second gate. The controller can be operable to move the first gate from the closed position to the open position to cause the food products on the first gate to fall to the second gate in the closed position. The controller can also be operable to move the second gate from the closed position to the open position as well as control the movement of the second gate from the initial spaced position to the subsequent spaced position. The controller further can cause the conveyor to deposit food products on the first gate while the first gate is moving from the open position to the closed position.

A method of forming a stack of food products can comprise sequentially forming a first row of food products on a gate in a closed position, such as on a first gate, and shifting the gate from the closed position to an open position to move the first row of food products past the gate. After the first row of food products is moved past the gate, the gate can shift back from the open position to the closed position. Subsequently, a second row of food products can be sequentially formed on the gate in the closed position at least in part during the step of shifting the gate from the open position back to the closed position. The first and subsequent rows of food products can further be formed on the gate by advancing the food products on a conveyor to the gate, where the individual food products can be segregated on the conveyor to advance a predetermined quantity of food products onto the gate. Likewise, the second and subsequent rows of food products formed on the gate can be moved past the gate by once again shifting the gate from the closed position to the open position.

After the first row of food products is moved past the gate it can be supported on a second gate in a closed position just below the first gate. The area between the second gate and the first gate above it can define a staging area for the multiple rows of food product gathered therein. This first row of food products can then be supported at an initial position spaced from the gate just after shifting the gate to release the food products. The first row of food products can then be supported at a second position spaced further from the gate (e.g., the first gate) than the initial position prior to shifting the gate from the closed to the open position to move the second row of food products past the gate. After the second row of food products moves past the gate, it can be supported on the first row of food products, which in turn can be supported on the second gate.

After the first row, second row and any subsequent rows, if any, of food products have moved past the first gate and are received on top of previous rows on the second gate, the second gate can cease to support the first row, second row and any subsequent rows of food products by opening to deposit these rows into a storage container. Thus, upon receiving the predetermined rows of food product, the second gate can be actuated to swing downward or pivot in an axial direction to open and allow the multiple rows of food product to move past the second gate and to drop downward, into the storage container or carton placed beneath it. Due to the lowering of the second gate after receipt of each subsequent row of food products, the second gate can eventually be lowered such that the distance between the second gate in the closed position and an opening of the storage container beneath it becomes minimized. By the time the second gate is actuated to open and drop the collected rows of food product, the opened second gate can generally be positioned just above the opening of the container and further can sit just inside an interior of the container. Therefore, the distance that the food products fall or are dropped upon opening of the second gate can be minimized and the orderly arrangement of the rows created on the second gate can be maintained within the container after the food products have been dropped into it.

DETAILED DESCRIPTION OF THE DRAWINGS

An apparatus for forming a stack of food products in a storage container, and an associated method of forming the stack by an automated process, are disclosed herein and illustrated in FIGS. 1-9. In particular, the food products can be transported in a machine direction along a conveyor line such that each food product, such as a cylindrical food product, is contained in its own separate cell along a conveyor belt on the line. As the food products are traveling along the conveyor belt they can be advanced onto a first gate, such as a slide gate, which can be controlled to open and release a row of food products onto a second gate below, such as a swing gate, and into a staging area. The food products can be dropped relatively simultaneously into the staging area where they can better maintain their alignment to form more orderly rows or layers of food products. After opening to drop the food products into the staging area, the first gate can return to its closed position and, as it does so, the next layer or row of food products can be sequentially deposited by the conveyor onto the first gate, thus providing the next group or layer of food products to be dropped into the staging area. The staging area can vary in size so that the distance the food products drop from the first gate is minimized. Once adequately filled, the second gate positioned at a lower end of the staging area can open and release the rows of food product into a container below.

Figure 1:
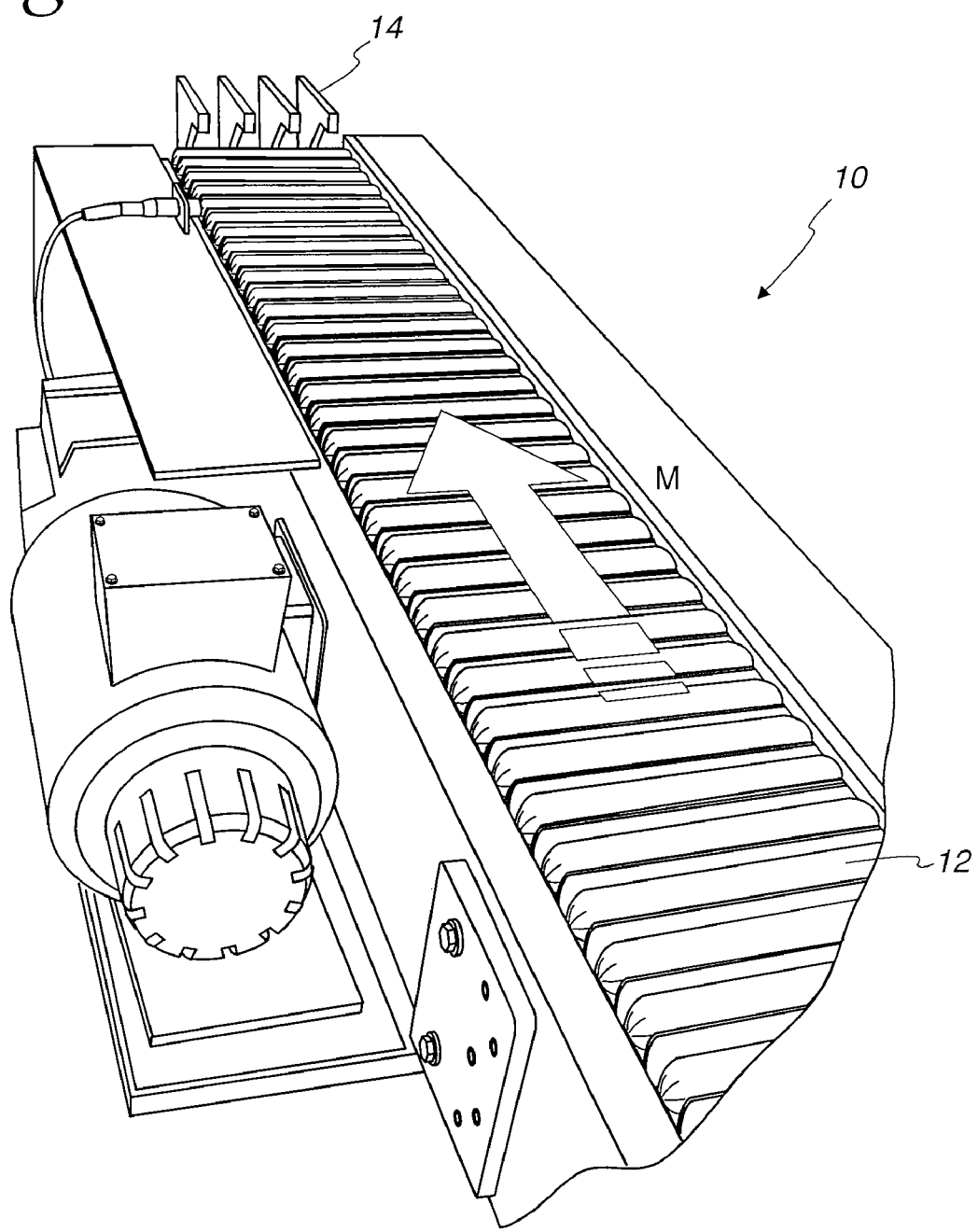
FIG. 1 is a perspective view of a conveyor line for transporting sausages to a first gate.
Figure 2:
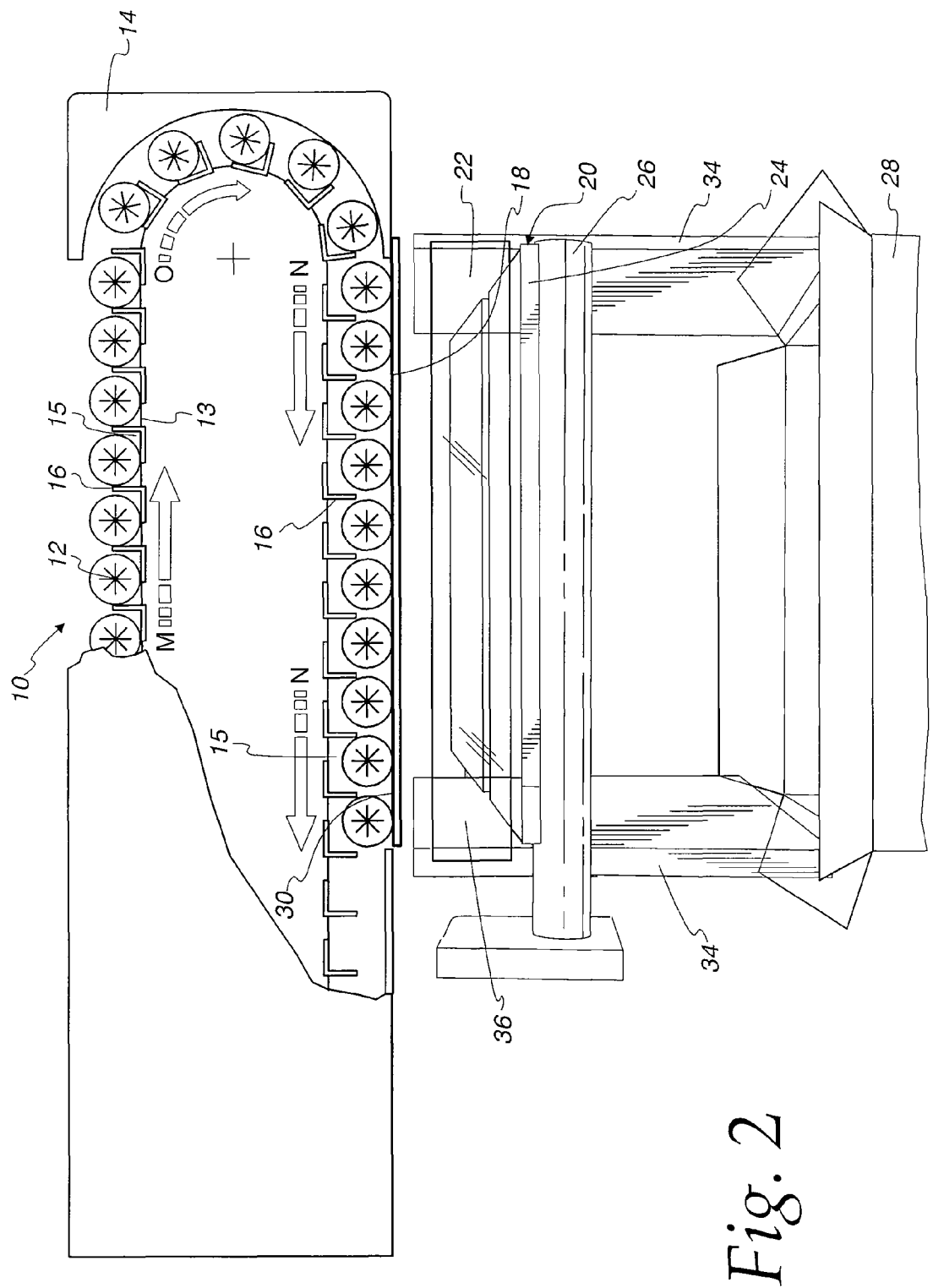
FIG. 2 is a perspective view of a loading area and a staging area.

Turning to FIG. 1, a conveyor line 10 is shown for transporting a series of generally cylindrical food products, such as sausages 12, in a machine direction, M. The conveyor line 10 can comprise a conveyor belt 13 having a plurality of discrete compartments with outwardly open ends or cells 15 separated by a series of divider walls or links 16, as shown in FIG. 2. Each cell 15 can individually hold or segregate an individual food product, such as sausage 12. The sausages 12 can be transported along the conveyor belt 13 in the machine direction M to advance the sausages 12 in a radial direction, as designated by arrow O. As the conveyor belt 13 advances in the direction O, the sausages 12 can be held in place by a series of fins or guide plates 14 positioned at the end of the conveyor line 10, and in one aspect there can be four guide plates 14, however, fewer or more guide plates 14 can be used. The guide plates 14 can aid in preventing the sausages 12 from falling out of their respective cells 15 as the belt 13 travels around the corner in the direction O.

After the conveyor belt 13 travels around the corner, it can again turn in a new direction; a relatively horizontal plane in the direction of arrow N, opposite from that in the initial machine direction, M. When the sausage 12 travels in the machine direction, M, it can rest upon the cell 15 such that it contacts a lower wall of the cell 15. However, when the belt 13 reverses direction of travel, as indicated by arrow N, the sausage 12 position becomes inverted such that they rest upon an upper surface 30 of a first gate 18, such as a slide gate 18, rather than resting upon the lower wall of their respective cells 15. For instance, the conveyor belt 13 can have a segment of the line 10 where the outwardly facing ends of the cells can be positioned above the slide gate 18. The sausages 12 can still be maintained individually on the conveyor belt 13, separated by the divider walls 16 of their respective cells 15. Therefore, the sausages 12 provided on the conveyor belt 13 can first be advanced in the M direction, then the O direction and finally in the N direction to the slide gate 18, or loading area. The conveyor 10 can be controlled by a controller which can cause the conveyor 10 to deposit the sausages 12 on the slide gate 18 while the slide gate 18 is also moving from an open to a closed position, as will be discussed further herein.

Figure 3:
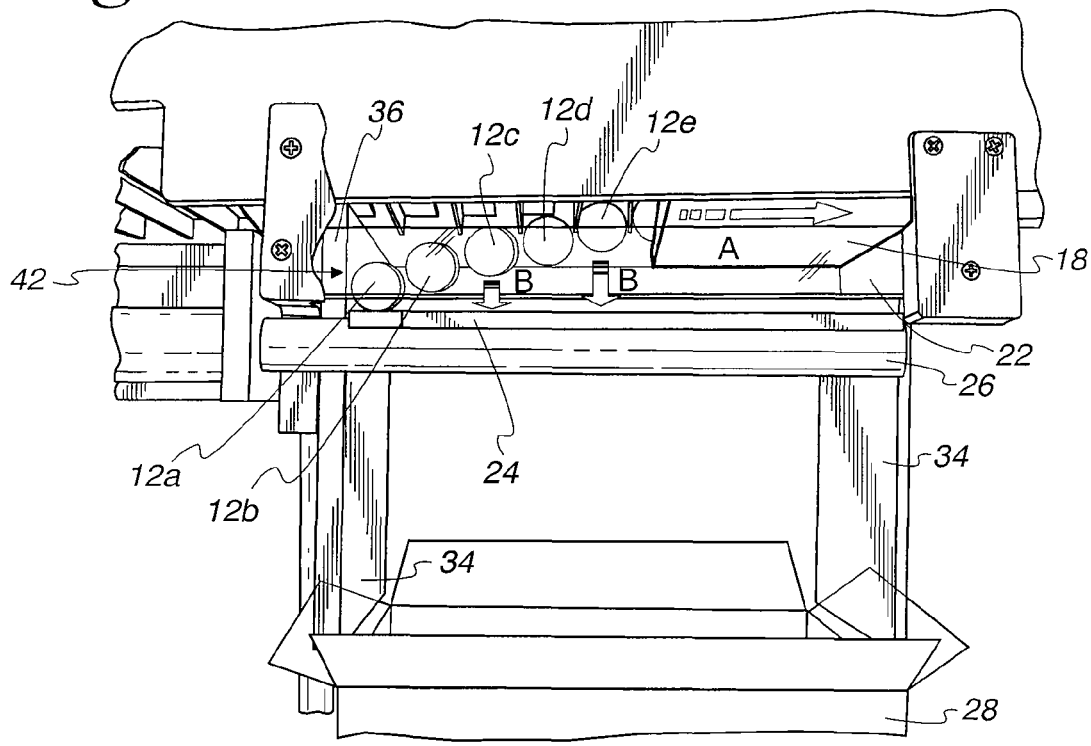
FIG. 3 is a perspective view of the loading and staging area of FIG. 2 as a first gate is opening and dropping sausages into the staging area.
Figure 4:
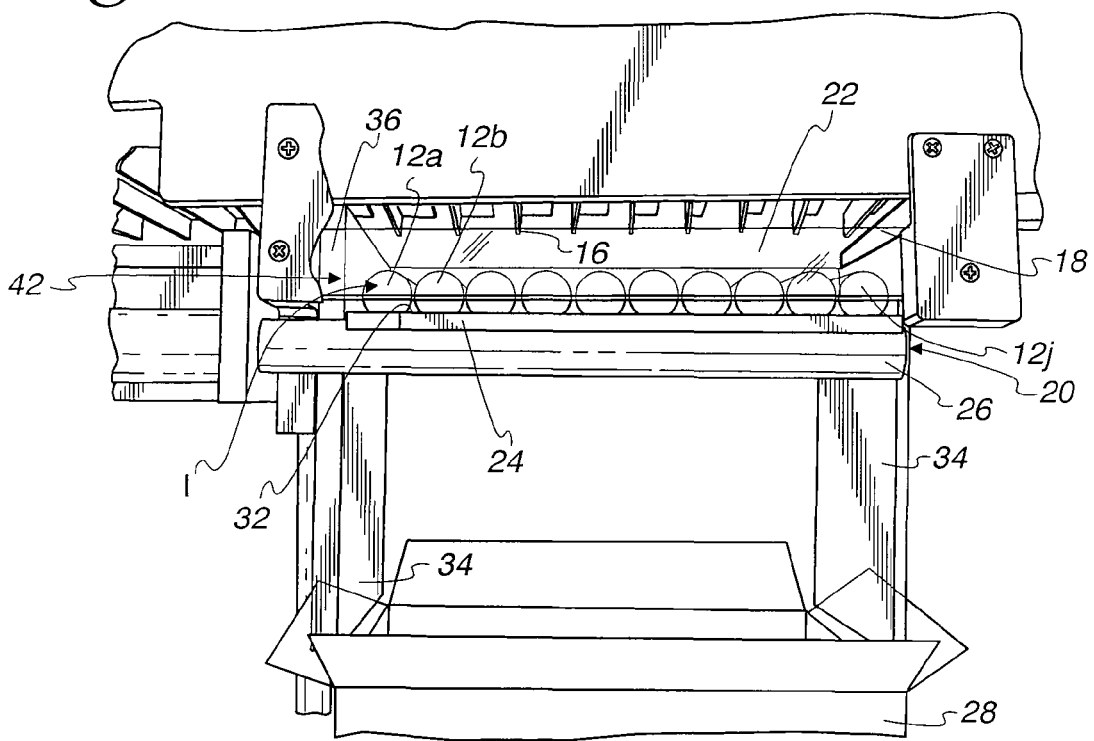
FIG. 4 is a perspective view of the loading and staging area of FIG. 2 after the first gate has completely opened and dropped an entire first layer of sausages into the staging area.

A first row I of sausages 12 can be advanced onto the slide gate 18 in the direction of arrow N. The slide gate 18 can be moveable between an open position (see FIG. 4) and a closed position (see FIG. 2), such that it can be shifted along a horizontal plane. Once a predetermined quantity of sausages 12 has been deposited onto the slide gate 18, the slide gate 18 can be shifted to the open position to drop the sausages 12 onto the next level below. The slide gate 18 can be shifted to open in the direction of arrow A, as shown in FIG. 3. The first gate 18, i.e., the slide gate 18, can be a generally planar plate. As the slide gate 18 starts to open, the first exposed sausage 12a can begin to drop in the direction of arrow B onto a second gate 20, such as a swing gate 20, and into a staging area, or temporary storage compartment 22 between the slide gate 18 and the swing gate 20. Similarly, as the slide gate 18 continues to open, the next exposed sausage 12b drops followed by the next sausage 12c and so on, until all of the sausages 12a-12j resting on the slide gate 18 have fallen into the staging area 22 and rest upon the swing gate 20. In one aspect, up to ten sausages 12a-12j are provided on the slide gate 18 and can fall when the gate 18 is opened due to the force of gravity acting upon them, and fall into the staging area 22 to provide the first layer I of sausage 12, as shown in FIG. 4. Any number of sausages 12 can be allowed to fall as the slide gate 18 is opened as long as they are all positioned on the slide gate 18 as it begins to open. The number of sausages 12 provided on the slide gate 18 will typically be equivalent to the number of sausages 12 that are desired to make up one row or layer in the final storage container 28 or carton 28. Therefore, the number of sausages 12 that are dropped through the slide gate 18 is typically dependant upon the size of the carton 28 that will eventually receive the rows of the food product.

The opening and closing of the slide gate 18 can be effected quickly such that the slide gate 18 can shift from its initial closed position to the open position and back to the closed position all within a matter of seconds or even milliseconds. As the slide gate 18 shifts in the direction of arrow A to open, the sausages 12 can drop a short distance into the staging area 22. After the last sausage 12j has dropped into the staging area 22, as shown in FIG. 4, the slide gate 18 can be timed to shift back in the direction of arrow D (as shown in FIGS. 5a-5c) to a closed position while the conveyor 13 sequentially deposits additional sausages 12 on the gate 18.

Figure 5A:
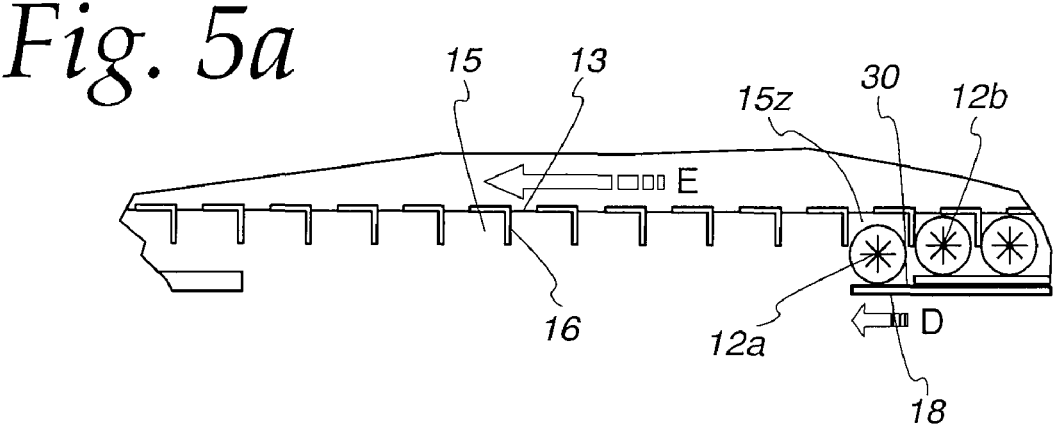
FIG. 5A is a side cross-sectional view of the loading area where the first gate is in the opened position.
Figure 5B:
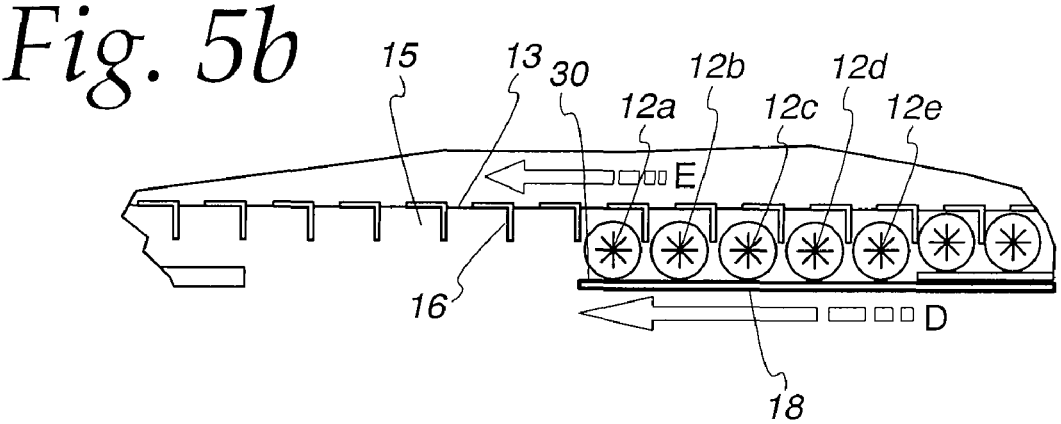
FIG. 5B is a side cross-sectional of the loading area with the first gate beginning to close and advancing a row of sausages.
Figure 5C:
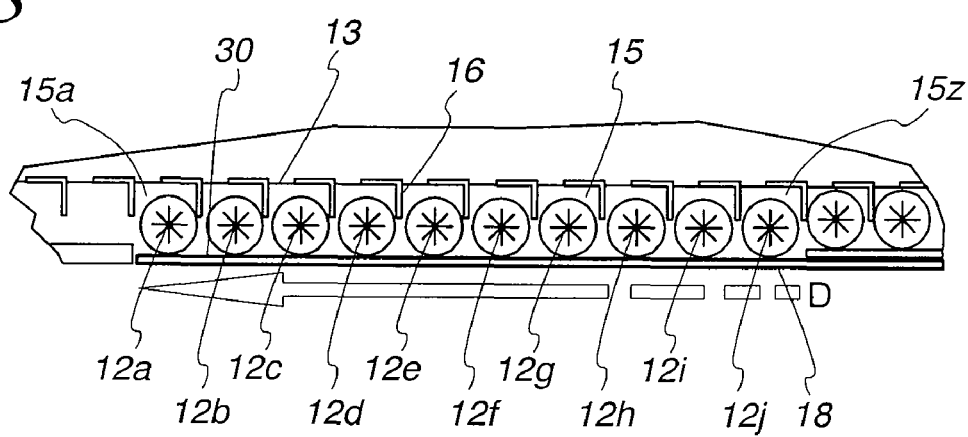
FIG. 5C is a side cross-sectional view of the loading area with the first gate in the fully closed position and a fully advanced row of sausages resting thereon.

The closing of the slide gate 18 and sequential depositing of the sausages 12 are illustrated in FIGS. 5a-5c, where upon shifting the slide gate 18 from the open to the closed position, as shown by the arrow D, the next row of sausage 12 is deposited, at least in part, in the direction of arrow E. As shown in FIG. 5a, as the slide gate 18 begins to close, i.e., to shift in the D direction, it can advance the next sausage 12a that rests on the upper surface 30 of the slide gate 18 in a position 15z. In this aspect, one sausage 12a can rest upon a portion of the opened slide gate 18, since the open gate 18 extends out a length long enough to only support one food product. However, if the slide gate 18 is programmed to partially open, then it will have a longer extended area on which to provide an upper surface for additional sausages 12 to rest upon. As the slide gate 18 continues to advance in the D direction it continues to pick up subsequent sausages 12b-12e, as seen in FIG. 5b, such that each sausage comes to rest on the upper surface 30 of the slide gate 18, or the loading area. Therefore, the first sausage 12a that rests upon the upper surface 30 of the slide gate 18 in position 15z when the gate 18 is fully open, is also the first sausage 12a that will drop into the staging area 22 when the slide gate 18 is subsequently opened to drop the next row, as shown by position 15a. As the slide gate 18 continues to close and shift in the direction D, it transports the next sausage 12f followed by the next one until all of the sausages 12a-12j that can fit on the upper surface 30 of the slide gate 18 have been advanced and the slide gate 18 has completely closed, as shown in FIG. 5c. After the slide gate 18 has completely closed, it has also completely advanced a second row II of sausage 12 onto the slide gate 18. Thus, after the slide gate 18 has fully closed, it can support a full row of sausage 12, which in this case can include a row of ten sausages that rest upon the upper surface 30 of the slide gate 18, ready to be dropped into the staging area 22 and onto either the swing gate 20 or an already-deposited row of sausages on the swing gate 20 upon the next opening of the slide gate 18. This process is continually repeated with each opening and closing of the slide gate 18 to advance the next subsequent row of sausage 12 to be dropped into the staging area 22.

The slide gate 18 can be controlled by a controller that can control the timing and operation of the slide gate 18 such that the controller is operable to move the slide gate 18 from the closed to the open position and back again. Further, the controller can operate a drive mechanism, such as a servo-motor, that can operate to move the slide gate 18 to the open or closed position. Additionally, the controller can be programmed to only open when a given quantity of sausages 12 are provided on the slide gate 18, such as by programming the drive mechanism to open the slide gate 18 based upon the final position of the belt 13 or the travel of belt 13 that corresponds to the desired number of sausages for each row. As the belt 13 advances forward in the N direction, the slide gate 18 typically is advancing with it until it is fully closed and contains a full row of sausages 12. For example, as the belt 13 advances in the N direction, the cell 15 that is in the last position $15z$ on the upper surface 30 of the slide gate 18 can become a cell 15 in the first position $15a$ (as shown in FIGS. $5a$-$5c$). Once the cells have fully advanced in this manner, the drive mechanism can actuate the slide gate 18 to open while briefly pausing the belt 13. Alternatively, the slide gate 18 can be programmed to open or close according to a certain number of sausages 12 that are present thereon, as can be determined by a mechanical eye or other electronic or mechanical counting mechanism that counts the number of sausages 12 that are advanced. Another alternative is to time the slide gate 18 to open after a certain interval of time has passed, such as synchronizing the opening to the speed of the line 10, and so forth.

Once the slide gate 18 is opened and the sausages 12 are dropped, moving the sausages 12 past the slide gate door 18, the sausages 12 can fall into the staging area 22, as in FIG. 4. After dropping into the staging area 22, the sausages 12 can come to rest upon the swing gate 20, which makes up a lower surface 32 of the staging area 22. Upon dropping, the sausages 12 can form a first orderly and aligned row I of sausage 12 resting in a single layer upon the swing gate 20. After the sausages 12 have dropped into the staging area 22, the slide gate 18 then shifts from the open position back to the closed position. The staging area 22 is an intermediate area that temporarily stores multiple rows of sausages 12 such that after a predetermined number of rows of sausage have been gathered, the swing gate 20 can shift to an open position and drop the rows into a carton 28 positioned below the staging area 22 and below the swing gate 20.

Figure 6:
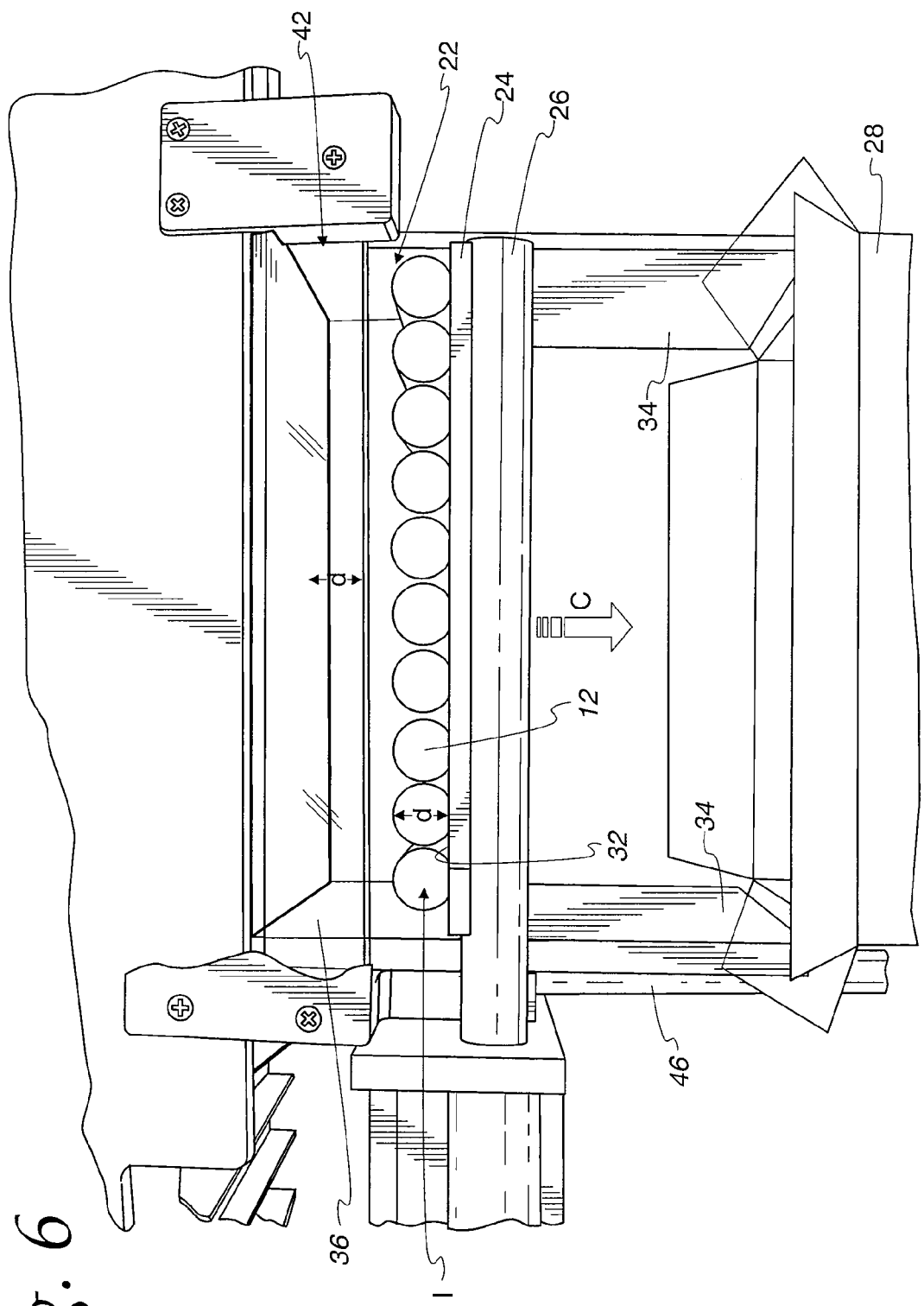
FIG. 6 is a perspective view of the staging area after it has received the first layer of sausages.
Figure 7:
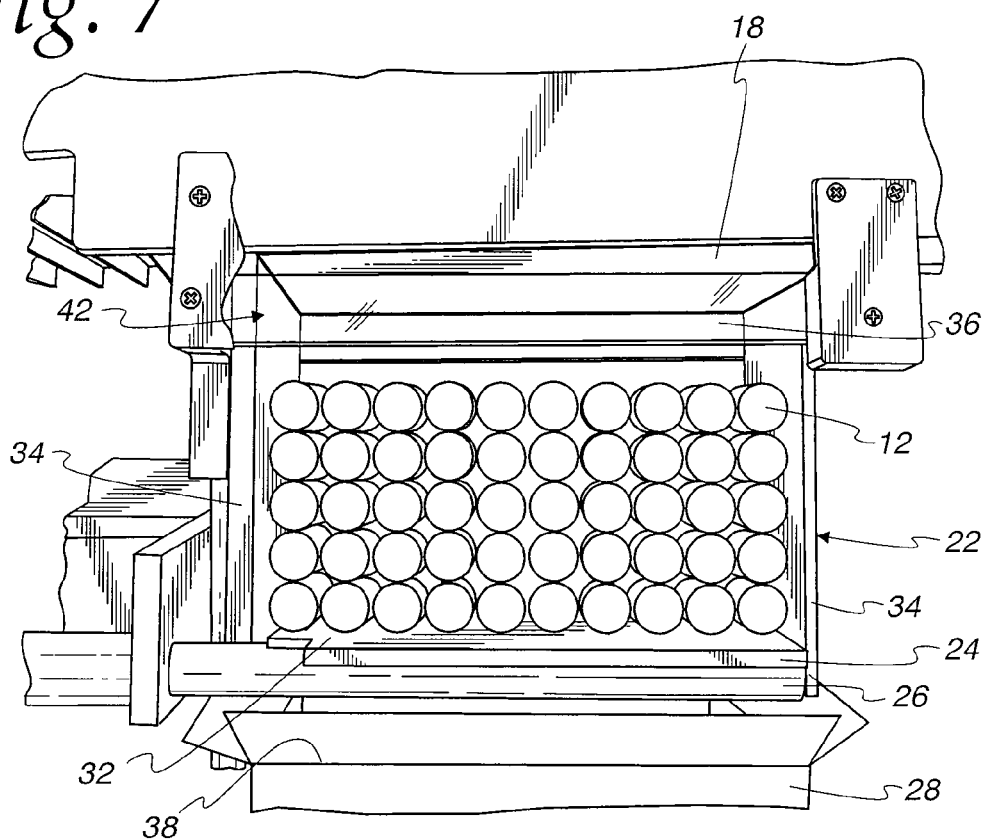
FIG. 7 is a perspective view of the staging area containing a stack of sausages.
Figure 8:
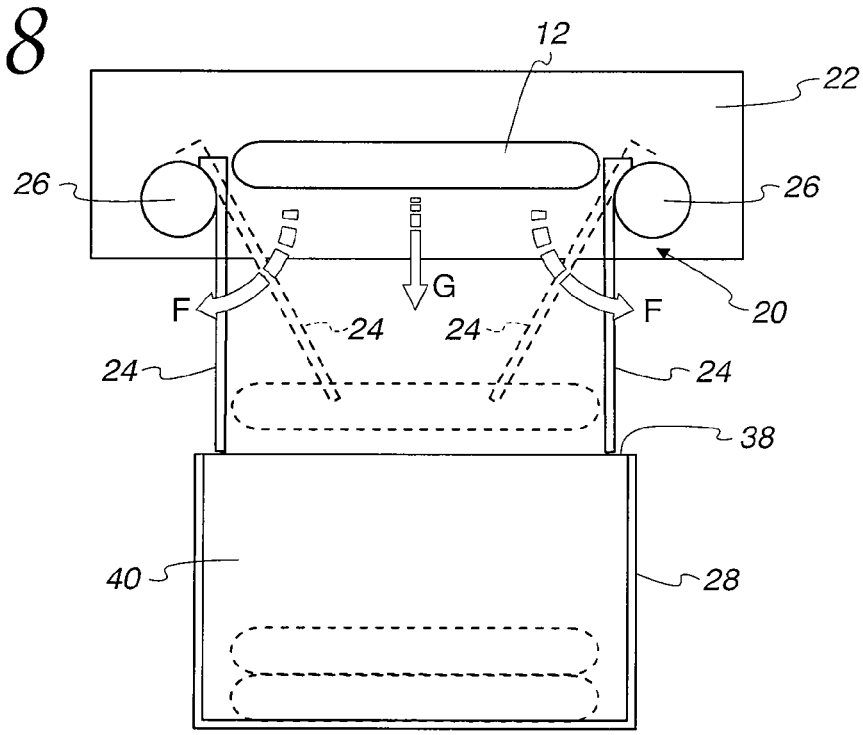
FIG. 8 is a schematic view of FIG. 7 showing a second gate opening to drop sausages into a carton.

The staging area 22 further has a mechanism that allows the entire staging area 22 to increase in size by shifting the swing gate 20 downward in the direction of arrow C, as shown in FIG. 6, after each row that it receives, except for the final row. For instance, after the first sausage row I drops into the staging area 22, the staging area 22 and closed swing gate 20 are positioned at a first, or initial, position spaced a distance from the slide gate 18. The swing gate 20 and staging area 22 can then be shifted to a second position spaced further from the slide gate 18 than the first position, such that it is shifted a distance that is approximately equivalent to the height of the next row of sausage 12. For example, where the sausage 12 has a diameter, d, then the staging area 22 can be lowered at least a distance, d, as well. In doing so, the staging area 22 can create adequate space to receive the next row of sausage 12 on top of the first row I and so on, while also minimizing or reducing the distance the sausages travel when falling during opening of the slide gate 18. The reduced falling distance from the slide gate 18 into the staging area 22 can advantageously maintain the orderly alignment within the staging area 22 that was provided on the slide gate 18 of the sausage row before being dropped. The first row I of sausage 12 is the only row to contact the swing gate 20. The second row II of sausage 12 is dropped on top of the first row I, the third row drops onto the second row II, and so on with each subsequent row. Furthermore, as the staging area 22 is continually lowered, the distance between the swing gate 20 and the slide gate 18 is continually increased such that additional rows of sausage 12 can be incorporated therein as they are dropped from the slide gate 18 above.

The swing gate 20 and therefore the entire staging area 22 can be moved together along at least a rail 46 located adjacent a pair of relatively stationary end walls 34 of the staging area 22. The lowering of the staging area 22 can also be controlled by the controller which can be operable to control the movement of the swing gate 20 from its initial spaced position to the subsequent spaced position. The controller can further move the staging area 22 by operating a drive mechanism, e.g., a servo-motor, that causes the staging area 22 to shift along the rail 46 after subsequent rows of sausage 12 are received. The drive mechanism can be timed to activate the lowering of the staging area 22 based upon the position of the slide gate 18, i.e., open or closed. For instance, the staging area 22 can be activated to shift downward a distance at least equal to one diameter of the sausage 12 as the slide gate 18 completes the sequence of opening and closing to drop a row of sausage 12. As soon as the sausage row has dropped into the staging area 22 and the slide gate 18 has closed, then the staging area 22 can be lowered. In one aspect, the staging area 22 can be lowered at relatively the same time as the slide gate 18 is shifting from the open to the closed position. Alternatively, the lowering of the staging area 22 can correlate to the speed of the conveyor line 10, or to some other variable.

Additionally, the staging area 22 can be partially defined by the pair of end walls 34, which are relatively stationary, the slide gate 18, and the swing gate 20. The staging area 22 can further contain a shield, such as a pair of side walls 36, that are also relatively stationary. When the staging area 22 is in its initial position, i.e., before the staging area 22 is lowered, as shown in FIGS. 2-4, it can contain four support walls, the two end walls 34 and the pair of side wall shields 36. The height of the stationary side walls 36 can be at least as high as the height of a single row I of sausage 12, i.e., a height equal to d, however, the height may be larger or smaller. The pair of side walls 36 are adjacent the slide gate 18 such that as the sausages 12 are being dropped into the staging area 22 they are initially supported from all four sides by walls which aid in alignment of the sausage 12 and can prevent the sausage 12 from rolling or falling out of the staging area 22 near its initial dropping point 42. In this example, regardless of how much the staging area 22 is lowered, the subsequent row of sausage 12 that drops from the slide gate 18 will first drop into the initial dropping point 42 defined by the four walls of the staging area 22, whether it is directly supported on the bottom by the swing gate 20 or the previous row of sausage 12.

As the staging area 22 is continually lowered, however, the staging area 22, and in particular the swing gate 20, begins to extend below the side walls 36 such that below the dropping point 42 the staging area 22 now may only comprise the pair of end walls 34 as support walls. The sausages 12 are typically arranged within the staging area 22 such that the longest length of the sausage 12 is parallel to the end walls 34, therefore, if the sausages 12 were to roll they would roll in a direction toward the end walls 34. Thus, the sausages 12 can be blocked from rolling out of the staging area 22 by the end walls 34, since the end walls 34 extend relatively the entire height of the staging area 22. Thus, the lack of side walls 36 near the lower end of the staging area 22 typically does not impact the sausages 12 since they are restricted in rolling from front to back in the direction of the side walls 36.

Once the staging area 22 has been filled with the desired number of sausage rows, the swing gate 20 can then shift to an open position to relatively simultaneously release all of the rows of sausage 12 gathered thereon. The swing gate 20 can consist of a pair of platform doors 24 which support the sausages 12 when in the closed position. The swing gate 20 is preferably provided as a pair of doors 24 that are pivotable away from each other to move the swing gate 20 from the closed position to the open position, however, a single door or platform may also be provided. The doors 24 can further pivot or open along pivot axes 26 that are generally parallel to the direction of travel of the slide gate 18. Upon shifting to the closed position from the open position, the doors 24 can pivot toward each other. When the swing gate doors 24 are in the closed position, the weight of the sausages 12 can be substantially entirely supported upon the doors 24. The pivot axes 26 can be located at an outer edge portion of the doors 24. The pivot axes 26 are typically located at the lowermost end of the staging area 22 and can pivot by rotating at least about 90 degrees to shift the swing gate platforms 24 from the closed position to the open position in the direction of arrow F, as can be seen in FIG. 8, and back again in the opposite direction to close.

The pivot axes 26 can likewise be actuated and controlled by a controller that can be operable upon the swing gate 20 to shift the swing gate 20 from a closed position to an open position and back again. The controller can operate a drive mechanism that can cause the doors 24 to open after a set position or height of the staging area 22 has been reached. For example, after the staging area 22 has been lowered to its final position, i.e., the lowest position to which it can be lowered, the swing gate 20 can be programmed to open after one last opening and closing of the slide gate 18 above in order to receive one final row of sausage 12 before opening the swing gate 20 to fill the carton 28. Alternatively, the swing gate 20 can also be programmed to open after a set time interval has elapsed, or upon filling of the staging area 22 with the predetermined quantity of sausage rows (determined either by weight, such as if a scale were integrated with the swing gate 20, or count), or so forth. The sausage rows can be relatively simultaneously dropped upon opening of the swing gate 20 into a carton 28 below the staging area 22, dropping into the carton 28 due to the force of gravity.

Furthermore, as a result of the staging area 22 being continually lowered after subsequent rows of sausage 12 have been dropped into the staging area 22, the final distance between a top opening 38 of the carton 28 and a lower surface 33 of the swing gate 20 is much less than the distance between the top opening 38 of the carton 28 and the lower surface 33 of the swing gate 20 at the initial starting position. Typically, the distance between the final position of the staging area 22 and the opening 38 of the carton 28 is minimized such that the lower surface 33 of the swing gate 20 rests just above the top opening 38 of the carton 28 or can even be positioned just inside the top opening 38. Thus, when the swing gate doors 24 are opened they can contact upper flaps 44 of the carton 28, which are extended upon filling of the carton 28 to allow product to pass, and can help to keep the upper flaps 44 open to allow the sausages 12 to be dropped into the interior 40 of the carton 28 relatively unimpeded by the flaps 44. Additionally, where a plastic bag or liner is also provided in the carton 28, the opening of the swing gate doors 24 can also further open the inside of the liner by pushing its upper opening outward towards the flaps 44 of the carton 28 to allow filling of the sausages 12 therein.

Figure 9:
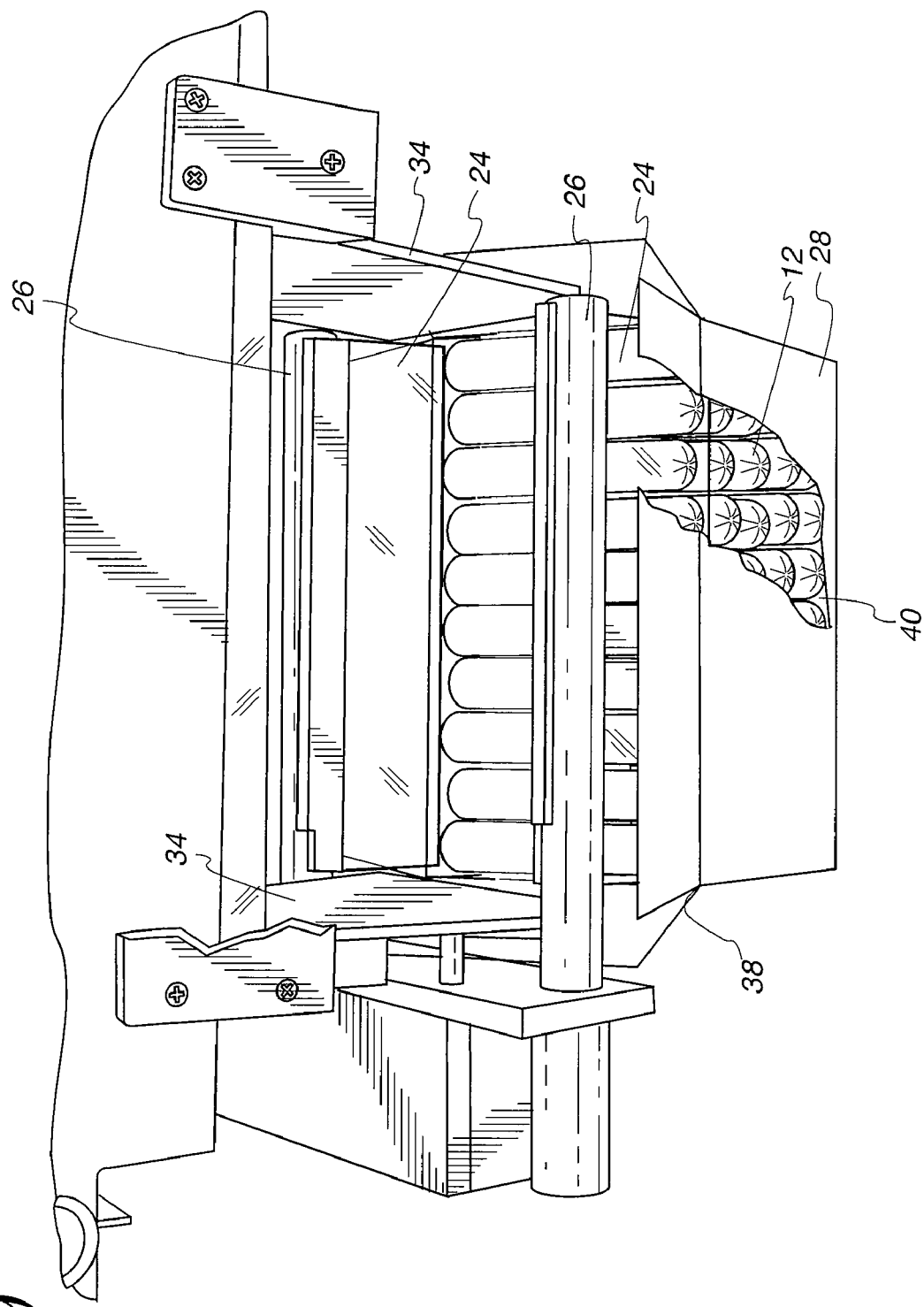
FIG. 9 is a perspective view showing a fully loaded carton containing the sausages.

Therefore, when the swing gate 20 is opened, the sausages 12 are not dropped a great distance into the carton 28, e.g., a distance not substantially greater than the height of the carton 28. This minimized dropping height helps to maintain the alignment of the sausage rows from within the staging area 22 to the interior 40 of the carton 28. As can be seen in FIG. 9, after the swing gate 20 has been opened and the sausage rows are dropped or released they fall into the carton 28 in an orderly fashion such that they maintain their alignment of the multiple sausage rows. For instance, in the example shown in FIG. 7, there are five rows of sausage 12 having ten sausages in each row, and upon dropping the sausage rows into the carton 28 the same number of rows of sausages, in this case five, can be generally maintained as well as generally maintaining ten sausages in each row, as shown in FIG. 9. While there may be some deviation in rows and numbers, the reduced distances for dropping can advantageously result in more orderly stacking and filling, as well as reduced damage to the sausages 12.

The length of the staging area 22, e.g., the distance from one end wall 34 to the other end wall 34, can typically correlate to the length of the carton 28 placed beneath the staging area 22. Furthermore, the final height of sausage rows can be relatively equal to a height of the carton 28. Generally, the final area of the staging area 22 can be approximately equivalent to an interior area of the carton 28 to be filled, such that the final dimensions of the staging area 22 are generally equivalent to the dimensions of the interior 40 of the carton 28. Additionally, in order to accommodate different sized cartons and/or different filling requirements (e.g., half full, three-quarters full, etc.) the staging area 22 can be made to be adjustable. For example, the end walls 34 can be adjusted inward or outward along a plane to provide for a staging area 22 that has a smaller or larger length (e.g., can accommodate less or more sausages in a row). Likewise, the swing gate 20 can be programmed to open at any height of the staging area 22, thus the number of rows of sausage 12 can be varied depending on the carton 28 height or the filling requirements or both. Standard cartons 28 used can typically have a length up to about 14 inches with a height between about 6 to 10 inches, although any size carton 28 can be used.

In an alternative aspect particularly useful when a tall carton is to be filled, such as a carton having a height of up to about 2 feet, the staging area may alternatively comprise multiple smaller staging areas rather than a single tall staging area. For example, if a single large staging area is to be used to fill a large carton, i.e., about 2 feet in height, then the staging area similarly would need to be about 2 feet in height. Once the 2 foot tall staging area is full of sausages, it can all be dropped into the carton at the same time. However, from an efficiency and speed standpoint, it may be faster to stage the drops of sausage in steps or segments, i.e., a few accumulated layers at a time, rather than dropping all of the layers at once. Further, more uniform rows or assemblies of sausages can be achieved if the rows do not need to drop as far.

Figure 10:
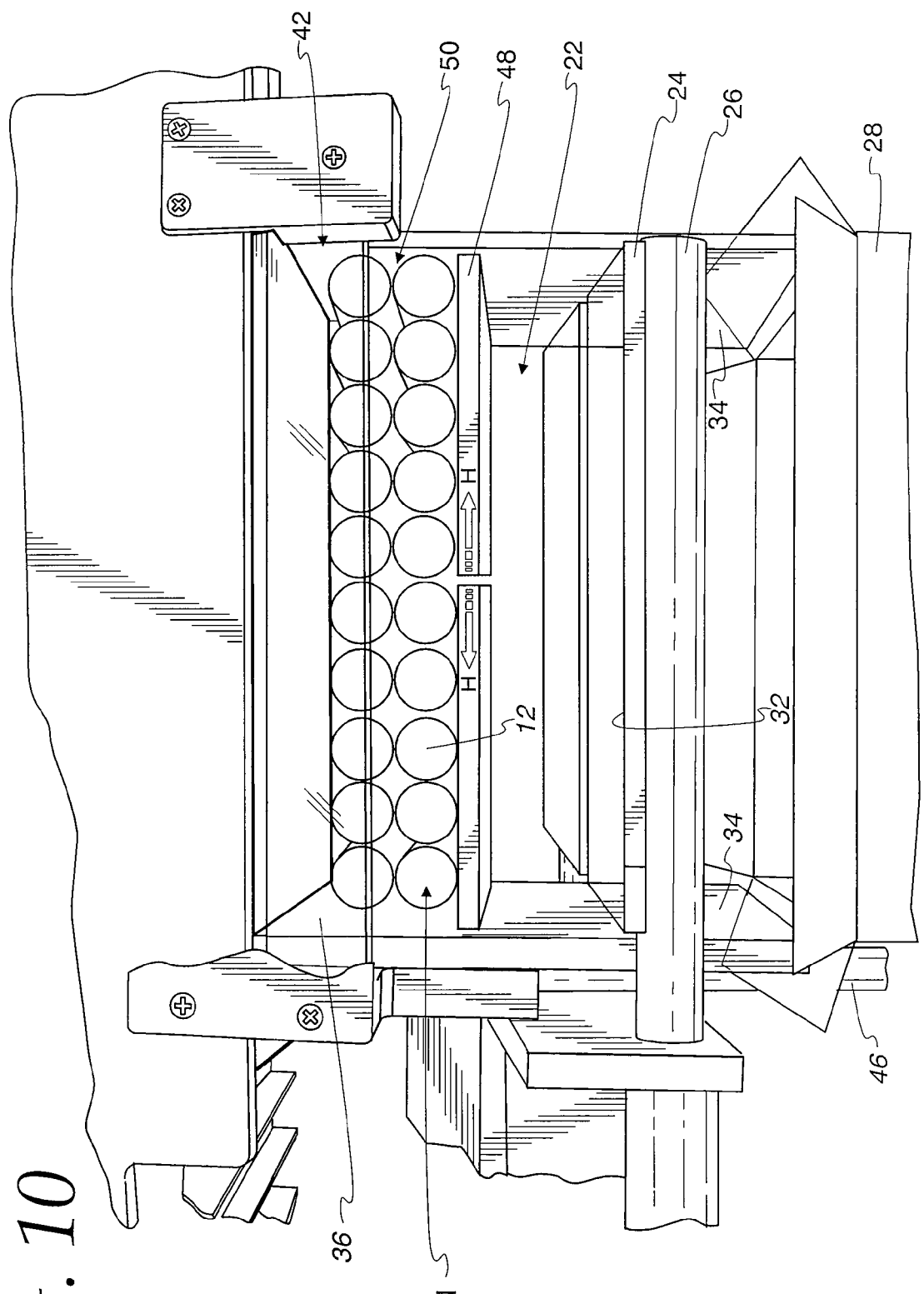
FIG. 10 is a perspective view of a second embodiment of a staging area.

This can be carried out by providing at least one additional gate, or intermediate gate 48, between the slide gate 18 and the swing gate 24, as shown in FIG. 10, or alternatively multiple intermediate gates located between the slide gate 18 and the swing gate 24. The additional gates can be any type of gate, such as a slide gate or swing gate. In the aspect shown in FIG. 10, the intermediate gate 48 can be a slide gate, such that it minimizes its extension into the staging area 22 (i.e., its doors do not swing open into the staging area 22), thus avoiding disrupting layers or rows of sausage already accumulated therein before being dropped into the carton below.

With the addition of an intermediate slide gate 48, an intermediate staging area, or holding area 50, can be created between the slide gate 18 and the staging area 22. The intermediate holding area 50 can be positioned above the staging area 22. This holding area 50 will be the initial area for receiving sausage layers as they are dropped from the slide gate 18 and conveyor 13 above. Furthermore, the intermediate gate 48 can be provided as a pair of slide gates 48 that retract away from each other in the direction of arrows H along a horizontal plane to an open position, thus creating a gap through which the accumulated sausage layers can fall through and into the staging area 22 below. However, the slide gates 48 can open and retract away from each other in any other convenient direction. Once the accumulated sausage layers fall into the staging area 22 they can be supported therein by the swing gates 20. Alternatively, the intermediate gate 48 can comprise a single slide gate door that shifts to an open position and retracts in a single direction, similar to the slide gate 18 of the conveyor 13 or, still alternatively, the intermediate gate 48 may comprise a swing gate having either a single platform door or a pair of platform doors similar to the swing gates 20 of the staging area 22.

Upon the intermediate slide gates 48 retracting to the open position, they can shift back to a closed position relatively immediately upon dropping the sausage layers. Once the intermediate gates 48 have shifted to the closed position, the holding area 50 is ready once again to begin receiving additional sausage layers. Additionally, the holding area 50 can similarly shift downwards after receiving each layer of sausage such that its intermediate gate 48 is spaced further from the slide gate 18 than its previous position. The holding area 50 can be lowered independently of the staging area 22 or it can be lowered in unison with the staging area 22.

After a desired number of sausage layers have accumulated in the staging area 22 from the holding area 50, the swing gates 20 can be shifted to the open position to drop a first set of sausage layers into the carton beneath it. This allows for a staged dropping of the sausage layers into the carton rather than dropping all of the sausage layers at once. The swing gates 20 can be opened after each desired number of layers it receives from the holding area 50, such that the swing gates 20 can provide for several drops of sausage layers from the staging area 22. Therefore, while the intermediate gates 48 remain closed to receive additional sausage layers thereon, the swing gates 20 within the staging area 22 below can be allowed to open and close, thus depositing sausage layers into the carton below in steps or stages all while the holding area 50 is filling with the next group of sausage layers. This action of filling the carton in steps while simultaneously accumulating additional sausage layers in the holding area 50 advantageously increases the efficiency, i.e., speed of filling, of the process.

A method of forming a stack of food products can comprise sequentially advancing a first row of food products, such as sausages, along the conveyor line 10 onto the first gate 18, such as the slide gate 18, maintained in the closed position to form the first row of food products. Once a predetermined quantity of sausages 12 has been advanced onto the slide gate 18, the slide gate 18 can be shifted from the closed position to the open position to move the first row of food products past the gate 18 and into the staging area 22 to drop onto the swing gate 20. As the slide gate 18 shifts to the closed position it at least in part advances the next subsequent row of sausage 12 to be dropped onto the slide gate 18. Once the gate 18 has completely closed and has received the predetermined number of sausage thereon, the slide gate 18 can be opened again. The subsequent row of sausage 12 is then dropped onto the row below it.

After each row of sausage is dropped onto the swing gate 20, except for the last, the swing gate 20 and its associated staging area 22 can be shifted downward. The swing gate 20 is at an initial position spaced from the slide gate 18 when the first row of sausage 12 is dropped onto the swing gate 20. After the first row is dropped, the swing gate 20 can be shifted to a second position that is spaced further from the slide gate 18 than the initial position. With each subsequent row of sausage 12 that is dropped, the swing gate 20 can be shifted to a subsequent position that is spaced further from the slide gate 18 than the previous position. With each shifting downward of the swing gate 20, the staging area 22 is increased.

After the staging area 22 is filled with the predetermined number of sausage rows, the swing gate 20 can be shifted from the closed position to the open position to move the collected rows past the swing gate 20 to deposit the rows in the carton 28 below, maintaining the alignment of the sausages 12 in their respective rows.

Although the method of forming a stack of food products in a carton in an orderly fashion is described in terms of sausages, it should be understood that other types of food products can similarly be used. For instance, other types of cylindrical food products or packages of food products, such as any other types of meats, cheeses, farinaceous food products, and the like can be aligned and stacked into a carton as described herein.

From the foregoing, it will be appreciated an apparatus for forming a stack of food products in a storage container and method thereof are provided such that numerous modifications and variations could be made thereto by those skilled in the art without departing from the scope of the apparatus and method set forth in the claims. Therefore, the disclosure is not limited to the aspects and embodiments described hereinabove, or to any particular embodiments. Various modifications to the apparatus and/or method of forming the stack within the container could be made which can result in substantially the same apparatus and method.

What is claimed is:

1. A method of forming a stack of food products, the method comprising:
   sequentially forming a first row of food products on a linearly reciprocal gate in a closed position;
   shifting the gate from the closed position to an open position in a first linear direction to move the first row of food products past the gate;
   shifting the gate from the open position back to the closed position in a second linear direction opposite the first linear direction after moving the first row of food products past the gate; and
   sequentially forming a second row of food products on the gate at least in part during the step of shifting the gate from the open position back to the closed position, wherein at least a portion of the second row of food products is advanced with the gate before the gate reaches the closed position.

2. The method according to claim 1, wherein the step of sequentially forming a first row of food products on a gate further comprises advancing the food products on a conveyor to the gate.

3. The method according to claim 2, further including the step of segregating the individual food products on the conveyer.

4. The method according to claim 3, wherein the conveyor advances a predetermined quantity of food products onto the gate.

5. The method according to claim 1, further including the step of supporting the first row of food products at an initial position spaced from the gate after the step of shifting the gate from the closed position to an open position to move the first row of food products past the gate.

6. The method according to claim 5, further including the step of shifting the gate from the closed position to the open position to move the second row of food products past the gate after the step of sequentially forming a second row of food products on the gate.

7. The method according to claim 6, further including:
supporting the first row of food products at a second position spaced further from the gate than the initial position prior to the step of shifting the gate from the closed position to an open position to move the second row of food products past the gate; and
supporting the second row of food products on the first row of food products after the second row of food products has moved past the gate.

8. The method according to claim 7, including the step of ceasing to support the first and second row of food products after moving past the gate to deposit the first and second row of food products into a storage container.

9. The method according to claim 1, further including repeating the step of forming a row of food products on the gate and shifting the gate from the closed to the open position to move the row of food products past the gate and into a temporary storage compartment.

10. The method according to claim 1, further including the step of forming a stack of food products on a second gate provided in a temporary storage compartment.

11. The method according to claim 10, further including shifting the second gate from an open to a closed position to release the stack of food products thereon into a storage container.

12. The method according to claim 1, wherein the first row of food products moves past the gate and into a temporary storage compartment.

13. The method according to claim 1, wherein the gate is a generally planar plate.

14. The method according to claim 1, wherein the step of sequentially forming a first row of food products on the gate in the closed position includes advancing the food products in a machine direction onto the gate and wherein the second linear direction of the gate is in the machine direction.

15. The method according the claim 1, wherein the step of shifting the gate from the closed position to an open position to move the first row of food products past the gate includes depositing the first row of food products into a temporary storage compartment and the method further comprises repeating the steps of forming a row of food products on the gate and shifting the gate from the closed to the open position to move the second row of food products past the gate and into the temporary storage compartment; forming a stack of food products on a second gate provided in the temporary storage compartment; and shifting the second gate from an open to a closed position to release the stack of food products thereon into a storage container.

16. A method of forming a stack of food products, the method comprising:
sequentially forming a first row of food products on a gate in a closed position;
shifting the gate from the closed position to an open position to move the first row of food products past the gate;
shifting the gate from the open position back to the closed position after moving the first row of food products past the gate;
sequentially forming a second row of food products on the gate at least in part during the step of shifting the gate from the open position back to the closed position, wherein at least a portion of the second row of food products is advanced with the gate before the gate reaches the closed position; and
forming a stack of food products on a second gate provided in a temporary storage compartment.

17. The method according to claim 16, further including shifting the second gate from an open to a closed position to release the stack of food products thereon into a storage container.

* * * * *

UNITED STATES PATENT AND TRADEMARK OFFICE
CERTIFICATE OF CORRECTION

Page 1 of 1

PATENT NO. : 8,215,087 B2
APPLICATION NO. : 12/334990
DATED : July 10, 2012
INVENTOR(S) : Malenke et al.

It is certified that error appears in the above-identified patent and that said Letters Patent is hereby corrected as shown below:

In Claim 15, Column 14, Line 8; after the word according, delete "the" and insert -- to --, therefor.

Signed and Sealed this
Eighth Day of January, 2013

David J. Kappos
*Director of the United States Patent and Trademark Office*